United States Patent
Berry et al.

(10) Patent No.: US 10,072,848 B2
(45) Date of Patent: Sep. 11, 2018

(54) FUEL INJECTOR WITH PREMIX PILOT NOZZLE

(71) Applicant: General Electric Company, Schenectady, NY (US)

(72) Inventors: Jonathan Dwight Berry, Simpsonville, SC (US); Michael John Hughes, Pittsburgh, PA (US); Kara Johnston Edwards, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 267 days.

(21) Appl. No.: 15/221,747

(22) Filed: Jul. 28, 2016

(65) Prior Publication Data
US 2017/0138600 A1    May 18, 2017

Related U.S. Application Data

(62) Division of application No. 14/102,846, filed on Dec. 11, 2013, now Pat. No. 9,435,540.

(51) Int. Cl.
*F23R 3/28* (2006.01)
*F02C 7/22* (2006.01)

(52) U.S. Cl.
CPC .............. *F23R 3/286* (2013.01); *F02C 7/222* (2013.01); *F05D 2220/32* (2013.01); *F23R 2900/03343* (2013.01)

(58) Field of Classification Search
CPC .. F23R 3/286; F23R 3/343; F23R 3/32; F23R 3/14; F23R 2900/03343
See application file for complete search history.

(56) References Cited

U.S. PATENT DOCUMENTS

| | | | |
|---|---|---|---|
| 4,100,733 | A | 7/1978 | Striebel et al. |
| 4,589,260 | A | 5/1986 | Krockow |
| 4,850,194 | A | 7/1989 | Fuglistaller et al. |
| 4,890,453 | A | 1/1990 | Iwai et al. |

(Continued)

FOREIGN PATENT DOCUMENTS

| | | |
|---|---|---|
| EP | 2405201 A2 | 1/2012 |
| EP | 2 631 544 A1 | 8/2013 |

(Continued)

OTHER PUBLICATIONS

European Search Report and Opinion issued in connection with related EP Application No. 16165555.0 dated Sep. 13, 2016.

(Continued)

*Primary Examiner* — Andrew Nguyen
(74) *Attorney, Agent, or Firm* — Dority & Manning, PA

(57) ABSTRACT

An apparatus for injecting premixed fuel and air through a center body and into the combustion zone of a gas turbine includes a fuel injector nozzle with a premix pilot nozzle having a plurality of premix passages in fluid communication with an air supply and a fuel supply that premixes air and fuel within the premix passages. The apparatus has either an active or passive fuel feed control. Fuel can be fed to the apparatus either conventionally or as a breech load circuit integrated into the oil cartridge. Fuel can be supplied passively via a fuel channel connecting the swozzle fuel plenum to the premix passages. Alternatively, fuel can be injected from the oil cartridge into the premix passages.

10 Claims, 15 Drawing Sheets

(56) References Cited

U.S. PATENT DOCUMENTS

| | | | |
|---|---|---|---|
| 4,982,570 | A | 1/1991 | Waslo et al. |
| 5,199,265 | A | 4/1993 | Borkowicz |
| 5,235,814 | A | 8/1993 | Leonard |
| 5,263,325 | A | 11/1993 | McVey et al. |
| 5,675,971 | A | 10/1997 | Angel et al. |
| 5,755,090 | A | 5/1998 | Hu |
| 5,901,555 | A | 5/1999 | Mandai et al. |
| 6,298,667 | B1 | 10/2001 | Glynn et al. |
| 6,363,724 | B1 | 4/2002 | Bechtel et al. |
| 6,438,961 | B2 | 8/2002 | Tuthill et al. |
| 6,446,439 | B1 | 9/2002 | Kraft |
| 6,609,380 | B2 | 8/2003 | Mick et al. |
| 6,857,271 | B2 | 2/2005 | Kraft et al. |
| 7,007,477 | B2 | 3/2006 | Widener |
| 7,854,121 | B2 | 12/2010 | Vandale et al. |
| 8,240,150 | B2 | 8/2012 | Varatharajan et al. |
| 8,347,631 | B2 | 1/2013 | Bailey et al. |
| 8,919,673 | B2 | 12/2014 | Subramanian et al. |
| 9,297,535 | B2 | 3/2016 | Uhm et al. |
| 2005/0229600 | A1 | 10/2005 | Kastrup et al. |
| 2009/0165436 | A1 | 7/2009 | Herbon et al. |
| 2009/0223228 | A1 | 9/2009 | Romoser |
| 2010/0031661 | A1 | 2/2010 | Varatharajan et al. |
| 2010/0084490 | A1 | 4/2010 | Zuo et al. |
| 2010/0293954 | A1 | 11/2010 | Widener |
| 2010/0293955 | A1 | 11/2010 | Berry et al. |
| 2010/0319353 | A1 | 12/2010 | Intile |
| 2011/0005229 | A1 | 1/2011 | Venkataraman et al. |
| 2011/0162371 | A1 | 7/2011 | Khan et al. |
| 2011/0252803 | A1* | 10/2011 | Subramanian ............ F23R 3/28 60/742 |
| 2012/0073302 | A1 | 3/2012 | Myers et al. |
| 2012/0079829 | A1* | 4/2012 | Berry ...................... F23R 3/286 60/772 |
| 2012/0096866 | A1 | 4/2012 | Khan et al. |
| 2012/0167586 | A1 | 7/2012 | Bailey et al. |
| 2012/0192565 | A1 | 8/2012 | Tretyakov et al. |
| 2013/0084534 | A1* | 4/2013 | Melton ...................... F23R 3/10 431/2 |
| 2013/0219899 | A1 | 8/2013 | Uhm et al. |
| 2013/0219903 | A1 | 8/2013 | Koizumi et al. |
| 2013/0306181 | A1 | 11/2013 | Mitchell et al. |
| 2013/0312422 | A1 | 11/2013 | Westmoreland et al. |
| 2014/0041389 | A1 | 2/2014 | Kajimura et al. |
| 2014/0190168 | A1 | 7/2014 | Shershnyov |

FOREIGN PATENT DOCUMENTS

| | | |
|---|---|---|
| EP | 2693123 A1 | 2/2014 |
| WO | 2014/081334 A1 | 5/2014 |

OTHER PUBLICATIONS

GB Search Report and Opinion issued in connection with related GB Application No. 1606106.1 dated Oct. 13, 2016.

U.S. Non-Final Office Action issued in connection with Related U.S. Appl. No. 14/555,143 dated Nov. 1, 2016.

U.S. Appl. No. 14/102,846, filed Dec. 11, 2013, Berry et al.

U.S. Appl. No. 14/555,074, filed Nov. 26, 2014, Gibson et al.

U.S. Appl. No. 14/555,143, filed Nov. 26, 2014, Stewart et al.

U.S. Appl. No. 14/688,170, filed Apr. 16, 2015, Romig et al.

U.S. Appl. No. 14/691,864, filed Apr. 21, 2015, Stewart.

* cited by examiner

FUEL INJECTOR WITH PREMIX PILOT NOZZLE

DIVISIONAL APPLICATION

The present application is a divisional application of U.S. application Ser. No. 14/102,846, filed on Dec. 11, 2013, which is incorporated herein by reference in its entirety and for all purposes. Any disclaimer that may have occurred during prosecution of the above-referenced application is hereby expressly rescinded.

FIELD OF THE INVENTION

The present invention generally involves a gas turbine engine that combusts a hydrocarbon fuel mixed with air to generate a high temperature gas stream that drives turbine blades to rotate a shaft attached to the blades and more particularly to the engine's fuel injector having a pilot nozzle that premixes fuel and air while achieving lower nitrogen oxides.

BACKGROUND OF THE INVENTION

Gas turbine engines are widely used to generate power for numerous applications. A conventional gas turbine engine includes a compressor, a combustor, and a turbine. In a typical gas turbine engine, the compressor provides compressed air to the combustor. The air entering the combustor is mixed with fuel and combusted. Hot gases of combustion are exhausted from the combustor and flow into the blades of the turbine so as to rotate the shaft of the turbine connected to the blades. Some of that mechanical energy of the rotating shaft drives the compressor and/or other mechanical systems.

As government regulations disfavor the release of nitrogen oxides into the atmosphere, their production as byproducts of the operation of gas turbine engines is sought to be maintained below permissible levels. Fuel-air mixing affects both the levels of nitrogen oxides generated in the hot gases of combustion of a gas turbine engine and the engine's performance. A gas turbine engine may employ one or more fuel nozzles to intake air and fuel to facilitate fuel-air mixing in the engine's combustor. The fuel nozzles may be located in a head end portion of the gas turbine engine, and may be configured to intake an air flow to be mixed with a fuel input. Typically, each fuel nozzle may be internally supported by a center body located inside of the fuel nozzle.

Various parameters describing the combustion process in the gas turbine engine correlate with the generation of nitrogen oxides (NOx). For example, higher gas temperatures in the combustion reaction zone are responsible for generating higher amounts of nitrogen oxides. One way of lowering these temperatures is by premixing the fuel air mixture and reducing the ratio of fuel to air that is combusted. As the ratio of fuel to air that is combusted is lowered, so too the amount of nitrogen oxides is lowered. However, there is a trade-off in performance of the gas turbine engine. For as the ratio of fuel to air that is combusted is lowered, there is an increased tendency of the pilot flame of the injector to burn out and thus render unstable the operation of the gas turbine engine. So-called Lean Blow Out (LBO) events, which are characterized by extinguished flames due to an air/fuel mixture that is too lean (insufficient fuel), increase emissions and reduce combustor efficiency.

U.S. Pat. No. 6,446,439, which is incorporated in its entirety herein by this reference for all purposes, injects fuel into an annular passage within the center body where mixing with air occurs, and the premixed mixture of air and fuel is then swirled and injected as a swirling pilot. However, combustion stability at very low levels of NOx emissions, i.e., below 3 parts per million (ppm), cannot be achieved in this manner.

Thus, a need exists for combustion stability at very low levels of NOx emissions, i.e., below 3 parts per million (ppm). In order to achieve very low levels of NOx emissions with some margin of error and non-uniformity around the turbine, stable operation (i.e., greatly improved avoidance of LBO) of the fuel injector is required.

BRIEF DESCRIPTION OF THE INVENTION

Aspects and advantages of the invention are set forth below in the following description, or may be obvious from the description, or may be learned through practice of the invention.

As used herein, a fuel supply circuit that feeds fuel only to one injection component, either the swozzle or the premix pilot, but not both of them, is considered to constitute an active fuel supply. A fuel circuit that feeds fuel to the swozzle and then feeds fuel to the premixed pilot is considered to supply fuel actively to the swozzle and passively to the premix pilot. An air circuit that is actively controlled/adjusted by means of a valve or other device external to the combustion hardware is considered to constitute an active air supply. Air flow that is controlled by fixed orifices or passages internal to the combustion hardware is considered a passive air supply.

One embodiment of the fuel injector with premix pilot nozzle of the present invention includes an apparatus for injecting premixed fuel and air from a plurality of premix passages formed in a premix pilot nozzle at the downstream end of a center body of the injector and into the combustion zone of a gas turbine. The premix pilot nozzle may be supplied with forced air from an active air supply or with passive air supplied through curtain air holes in a conventional swozzle disposed upstream from the premix pilot nozzle. The premix pilot nozzle may be supplied with passive air supplied downstream from a conventional swozzle and through the fuel injector's peripheral wall from the compressed air supplied to the head end volume of the fuel injector. The premix pilot nozzle may be supplied with fuel either actively or passively. Passive fuel feed can be supplied by adding a fuel channel between the conventional swozzle fuel plenum through the premix pilot nozzle wall and injecting this fuel into the premix passages of the premix pilot nozzle. The premix pilot nozzle may have fuel fed conventionally or as part of a breech load circuit integrated into the oil cartridge.

In another embodiment of the present invention, fuel could be injected from the oil cartridge into the pilot premixing tubes.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
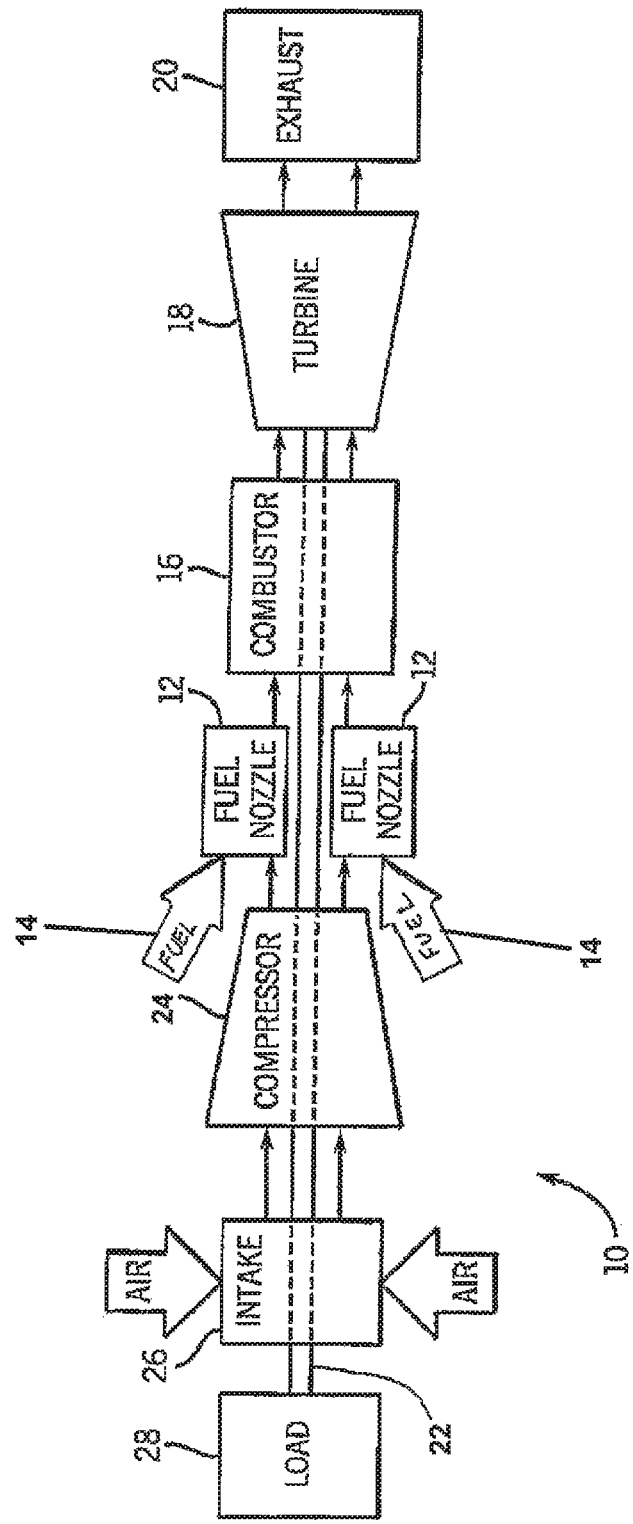
FIG. 1 is a block diagram of a turbine system having fuel nozzles coupled to a combustor in accordance with an embodiment of the present technique.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all ranges located within the prescribed limits (i.e., sub-ranges and sub-limits). For instance, a range from 100 to 200 also includes sub-ranges from 110 to 150, 170 to 190, 153 to 162, and 145.3 to 149.6. Further, a limit of up to 7 also includes a sub-limit of up to 5, up to 3, and up to 4.5, as well as sub-ranges within the limit, such as sub-ranges from about 1 to 5 and from 3.2 to 6.5.

Figure 2:
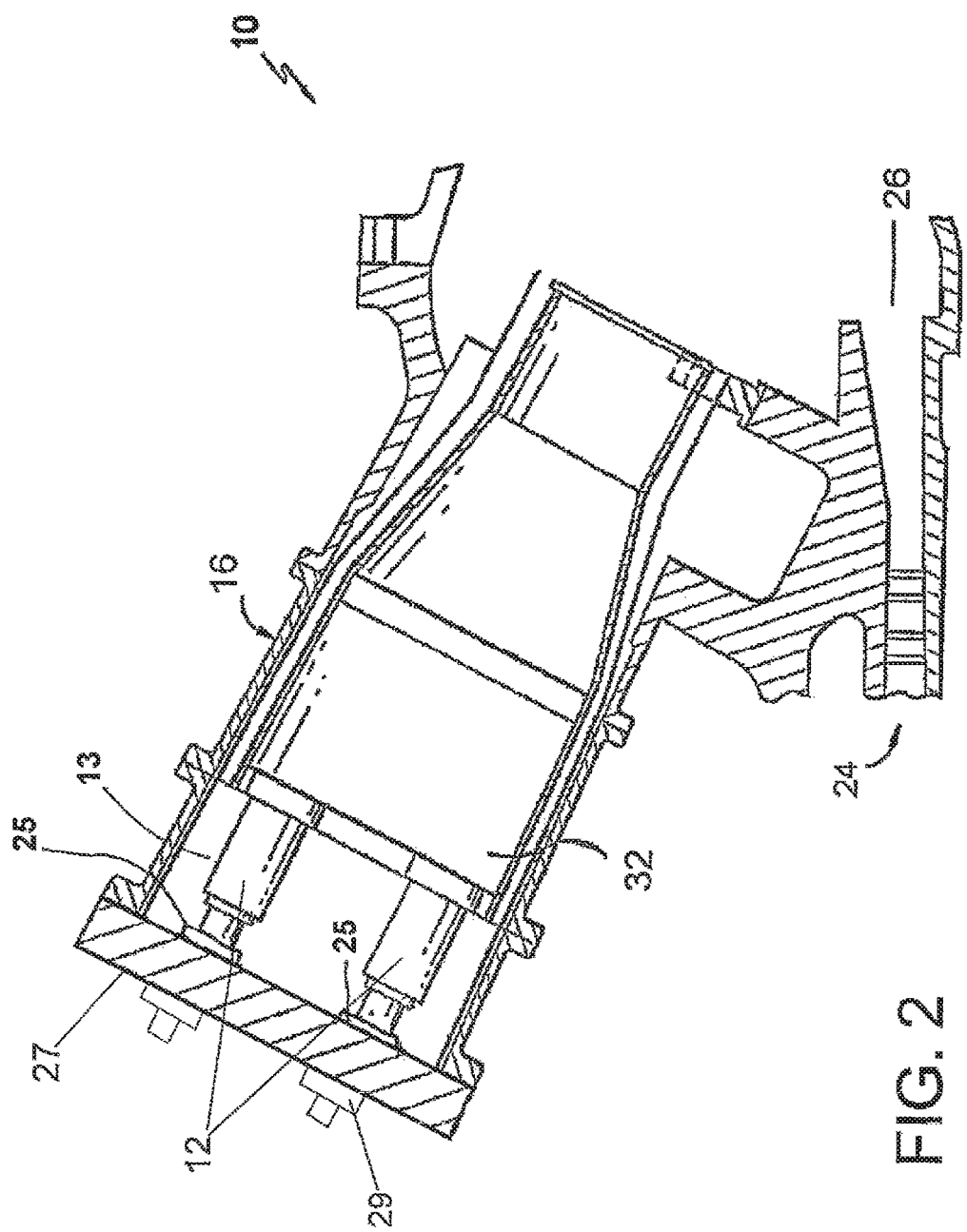
FIG. 2 is a cross-sectional view of several portions of a gas turbine system of the present disclosure.
Figure 6:
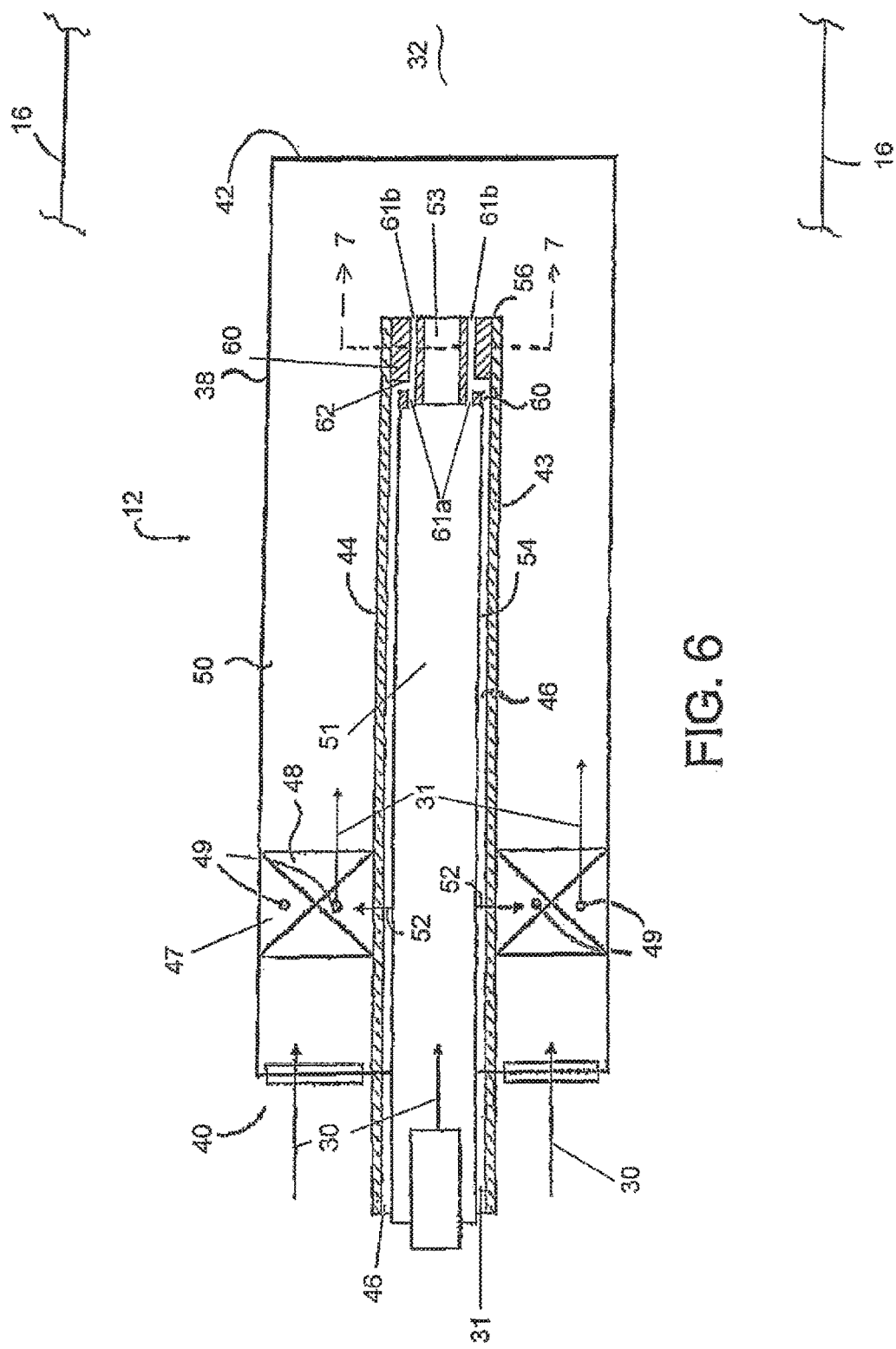
FIG. 6 is a schematic representation of a fuel nozzle with premix pilot nozzle in accordance with another embodiment of the present invention.

Referring to FIG. 1, a simplified drawing of several portions of a gas turbine system 10 is schematically illustrated. The turbine system 10 may use liquid or gas fuel, such as natural gas and/or a hydrogen rich synthetic gas, to run the turbine system 10. As depicted, a plurality of fuel nozzle assemblies 12 intakes a fuel supply 14, mixes the fuel with air, and distributes the air-fuel mixture into a combustor 16. As shown in FIG. 2 for example, fuel nozzle assemblies 12 are connected to an end plate 27 of the combustor 16 by nozzle flanges 25 and fuel may be supplied passively or actively to each fuel nozzle assembly 12 through the end plate 27 of the combustor 16. As explained more fully below, the fuel supply 14 takes on a number of different alternative embodiments. As schematically shown in FIG. 2 for example, fuel nozzle assemblies 12 may include a breech-loaded premix pilot nozzle 60 (FIG. 15) connected to an end plate 27 of the combustor 16 by pilot flanges 29. As schematically shown in FIGS. 2 and 6 for example, the air-fuel mixture combusts in a combustion chamber reaction zone 32 within the combustor 16, thereby creating hot pressurized exhaust gases. As schematically shown in FIG. 1, the combustor 16 directs the exhaust gases through a turbine 18 toward an exhaust outlet 20. As the exhaust gases pass through the turbine 18, the gases force one or more turbine blades to rotate a shaft 22 about an axis of the system 10. The shaft 22 may be connected to various components of the turbine system 10, including a compressor 24 that also includes blades that may be coupled to the shaft 22. As the shaft 22 of the turbine 18 rotates, the blades within the compressor 24 also rotate, thereby compressing air from an air intake 23 and forcing the compressed air into the combustor's head end volume 13 and/or fuel nozzles 12. The shaft 22 also may be connected to a mechanical load 28, which may be a vehicle or a stationary load, such as an electrical generator in a power plant or a propeller on an aircraft, for example. The load 28 may include any suitable device capable of being powered by the rotational output of the turbine system 10.

FIG. 2 illustrates a cross sectional side view of portions of an embodiment of the turbine system 10 schematically depicted in FIG. 1. The embodiment of the turbine system 10 illustrated in FIG. 2 includes a pair of fuel nozzles 12 located inside the head end volume 13 of a combustor 16. Each illustrated fuel nozzle 12 may include multiple fuel nozzles integrated together in a group and/or a standalone fuel nozzle, wherein each illustrated fuel nozzle 12 relies at least substantially or entirely on internal structural support (e.g., load bearing fluid passages). In operation, air enters the turbine system 10 through the air intake and may be pressurized in the compressor 24. As schematically shown in FIG. 2 for example, the compressed air enters the head end volume 13 of the combustor 16 from the diffuser exit 26. The compressed air then may be mixed with fuel (e.g., hydrocarbon gas or liquid) for combustion within the combustor 16. For example, the fuel nozzles 12 may inject a fuel-air mixture into the combustor 16 in a suitable ratio for optimal combustion, emissions, fuel consumption, and power output.

Figure 3:
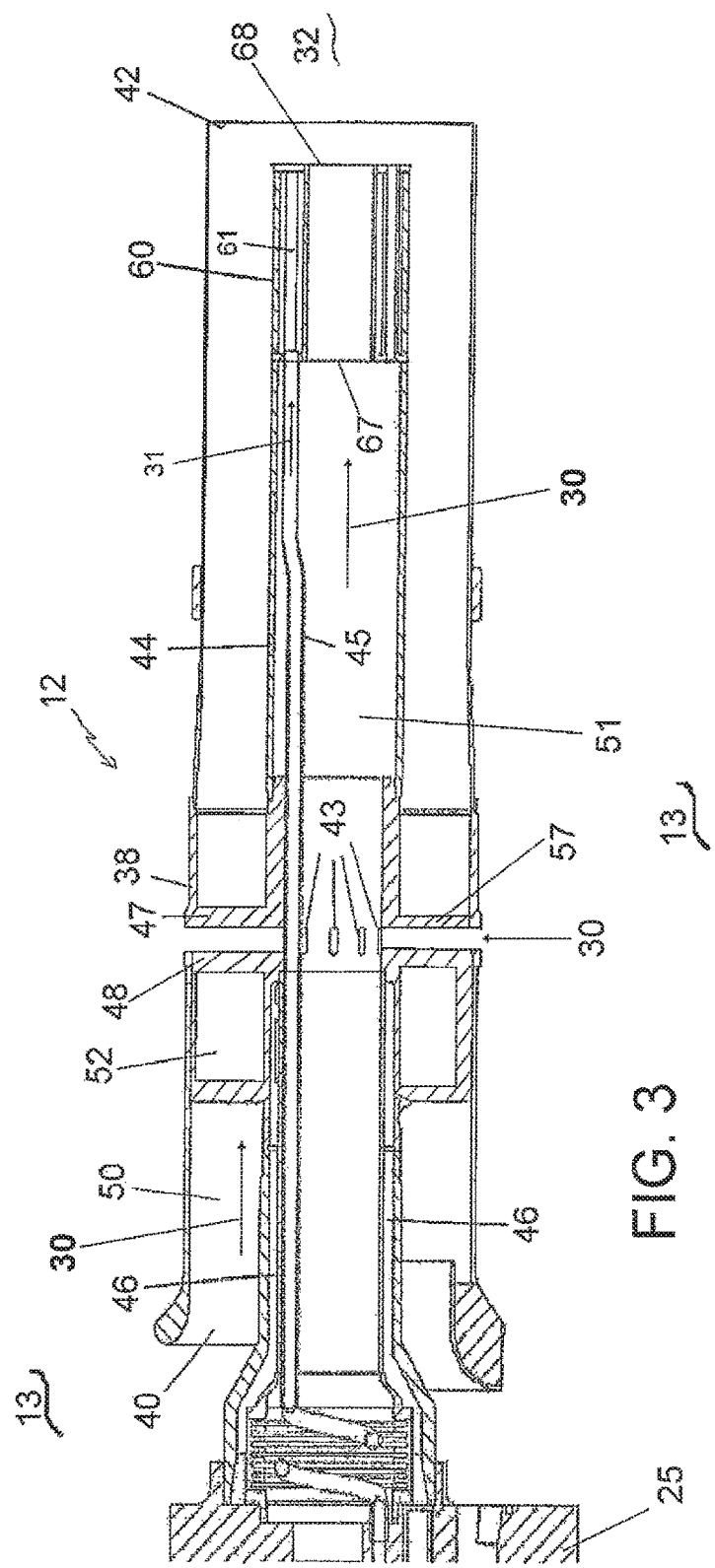
FIG. 3 is a schematic representation of a cross-sectional view of a fuel nozzle with premix pilot nozzle in accordance with an embodiment of the present invention.

As schematically shown in FIGS. 3 and 6 for example, embodiments of the nozzle assembly 12 can be formed with an axially elongating peripheral wall 38 having an air inlet 40 and a nozzle outlet 42. A center body 44 extends into the nozzle assembly 12 along the longitudinal central axis of the nozzle assembly 12. As schematically shown in FIG. 6 for example, the center body 44 can include an inner cylindrical wall 54 that defines a hollow interior 51 of the center body 44. The inner cylindrical wall 54 is concentrically arranged about the center or longitudinal axis of the nozzle assembly 12 and is configured and disposed for supplying air to the downstream end of the center body 44.

The arrows designated 30 in the FIGs., including for example FIGS. 3 and 6, schematically indicate the flow of air in the direction in which the arrow is pointing. Similarly, the arrows designated 31 in the FIG., including for example in FIGS. 4 and 6, schematically indicate the flow of fuel in the direction in which the arrow is pointing.

As schematically shown in FIG. 6 for example, the center body 44 desirably can define a fuel supply passage configured as an annular fuel passage 46 that supplies some portion of fuel to a swozzle, which defines a radially oriented fuel premix injection ring 48 that surrounds the center body 44 and extends radially between the center body 44 and the peripheral wall 38. The portion of the fuel that is supplied to the radially oriented fuel premix injection ring 48 is considered to be an active fuel supply because it is actively controlled as it is pumped into the fuel premix injection ring 48. As schematically shown in FIGS. 3 and 6, during operation, pressurized air exiting the compressor 24 (not shown in FIGS. 3 and 6) flows into the radially outer air passage 50 defined between the peripheral wall 38 and the outer wall 44 that defines the center body 44 of each fuel nozzle assembly 12.

The fuel premix injection ring 48 desirably includes swirler vanes 47 that swirl the air flowing past the vanes 47 in the radially outer air passage 50. Fuel outlet openings 49 (not shown in FIG. 3) are defined through the swirler vanes 47 of the fuel premix injection ring 48. As schematically shown in FIG. 6, fuel from the annular fuel passage 46 flows through radial fuel passages 52 into the fuel premix injection ring 48 and exits out of the fuel outlet openings 49 (not shown in FIG. 3) defined through the swirler vanes 47 of the fuel premix injection ring 48. The fuel ejected from the fuel outlet openings 49 is supplied into the radially outer air passage 50 for premixing fuel and air in the radially outer air passage 50 upstream of the combustion chamber reaction zone 32. As air is directed against the air swirler vanes 47, a swirling pattern is imparted to the air, and this swirling pattern facilitates the mixing of the air with the primary fuel that is ejected from the fuel outlet openings 49 of the air swirler vanes 47 into the passing air flow. The air/fuel mixture exiting the radially outer air passage 50 flows into the combustion chamber reaction zone 32, where the air/fuel mixture is combusted.

Figure 4:
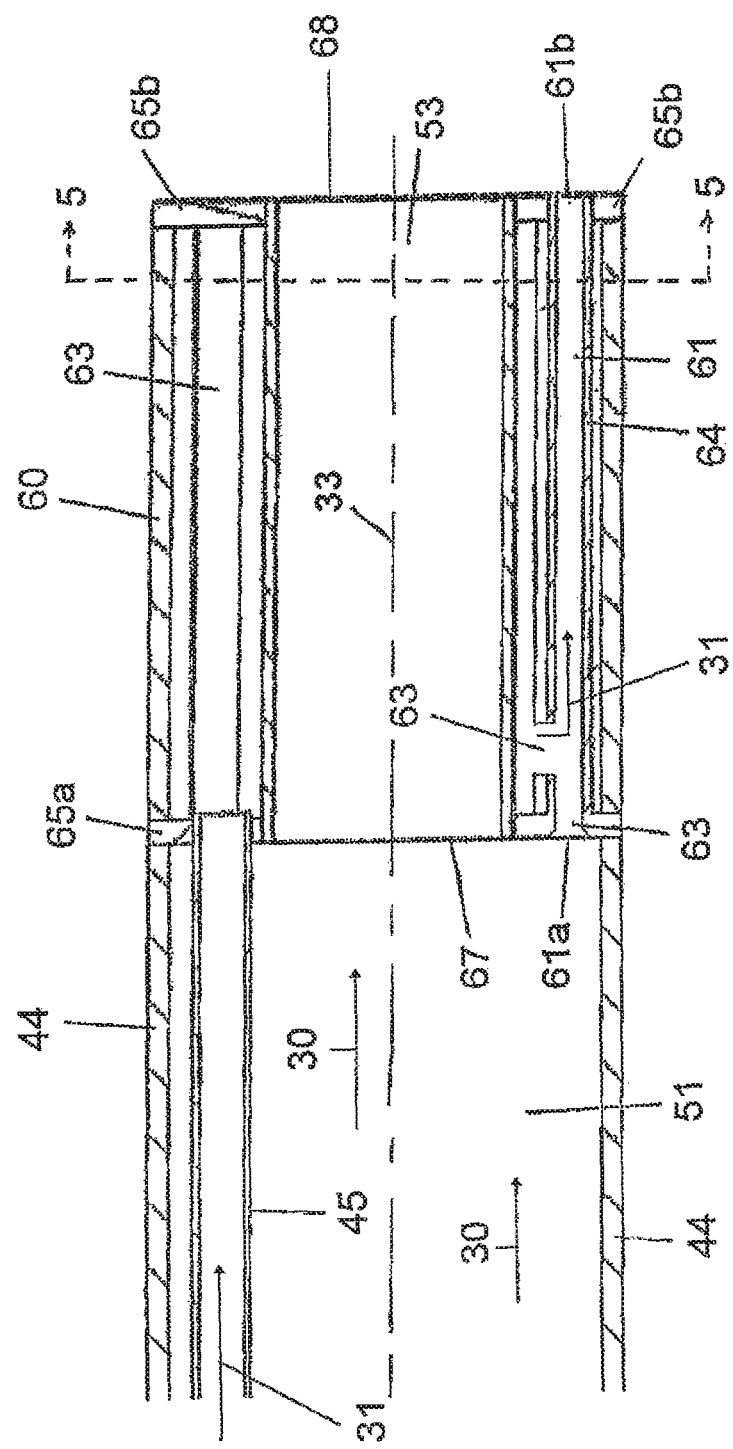
FIG. 4 is a schematic representation of a cross-sectional view taken along the lines 4-4 in FIG. 5 of a part of a premix pilot nozzle in accordance with an embodiment of the present invention shown in FIG. 3.
Figure 5:
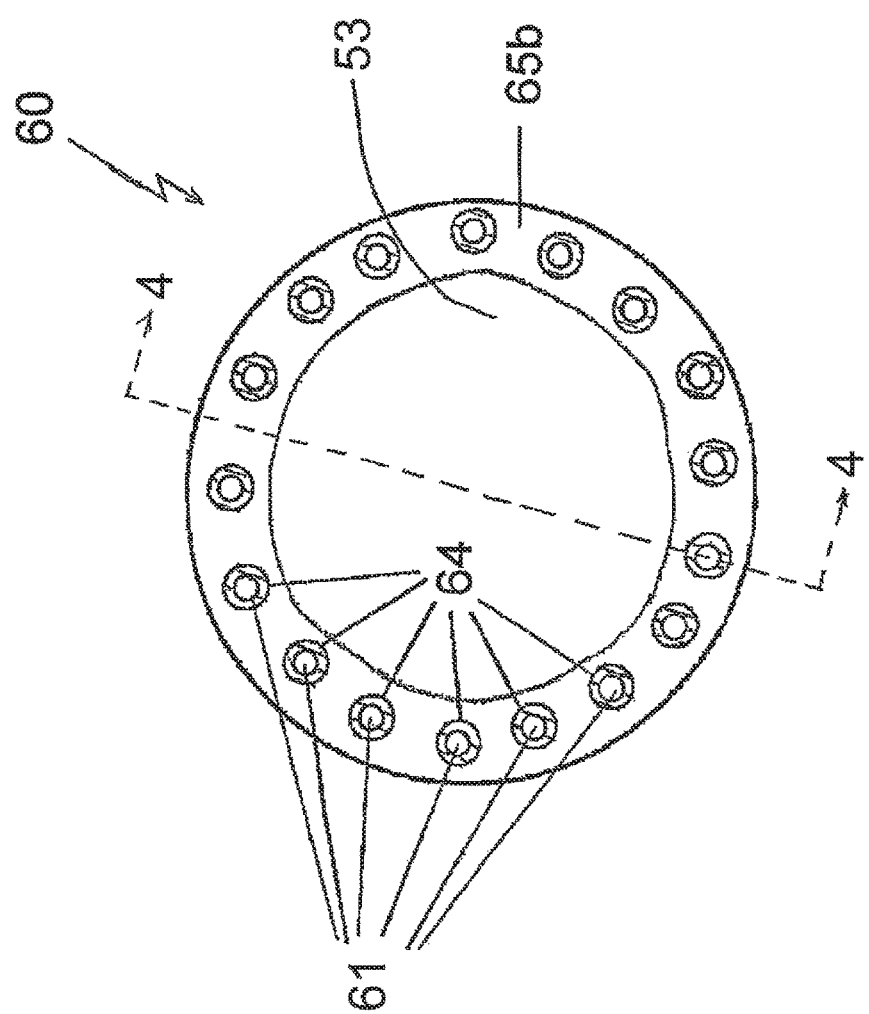
FIG. 5 is a schematic representation of a cross-sectional view taken along the lines 5-5 in FIG. 4 of a premix pilot nozzle in accordance with an embodiment of the present invention shown in FIG. 3.

As schematically shown in FIGS. 3, 4 and 5, an exemplary embodiment of the premix pilot nozzle 60 defines a plurality of axially elongated, hollow premix passages 61. As schematically shown in FIGS. 3 and 4 for example, the premix pilot nozzle 60 has an inlet 67 at the upstream end that is connected to the downstream end of the center body 44. The premix pilot nozzle 60 has an outlet 68 at the downstream end that is disposed axially opposite the upstream end of the premix pilot nozzle 60. As schematically shown in FIG. 4 for example, the premix pilot nozzle 60 defines an axially extending inner channel 53 that fluidly communicates with the hollow interior 51 of the center body 44.

As schematically shown in FIG. 4 for example, each premix passage 61 has an upstream end disposed near the downstream end of the center body 44. The upstream end of each premix passage 61 defines a fill opening 61a that admits fluid to flow into the hollow premix passage 61 and communicates fluidly with the interior passage 51 of the center body 44. Each premix passage 61 has a downstream end disposed axially opposite the upstream end of the premix passage 61 and that is disposed near the downstream end of the premix pilot nozzle 60. Each downstream end of each premix passage 61 defines an exit opening 61b that allows fluid to discharge from the hollow premix passage 61.

In the embodiment of the premix pilot nozzle 60 schematically shown in FIGS. 3, 4 and 5, the premix passages 61 in the premix pilot nozzle 60 are defined as the hollow interiors of a plurality of premix tubes 64 disposed circumferentially around the axial centerline 33 (FIG. 4) of the premix pilot nozzle 60. As schematically shown in FIG. 4 for example, each premix tube 64 in this embodiment of the premix pilot nozzle 60 extends axially between an upstream end plate 65a and a downstream end plate 65b of the premix pilot nozzle 60. As schematically shown in FIG. 5, there are seventeen premix passages 61 arranged in a circle near the outer perimeter of the premix pilot nozzle 60, which desirably has a diameter measuring about 5.1 cm. Each premix passage 61 desirably has an axial length in the range of 7.6 cm to 12.7 cm, and the diameter of each premix passage 61 desirably measures less than 6.35 mm and desirably has a range of 2.54 mm to 5.1 mm. This embodiment of the premix pilot nozzle 60 desirably attains about a three percent air/fuel mix. However, the diameters and the number of premix passages 61 formed in the premix pilot nozzle 60 will depend on the flows deemed optimal under the anticipated operating conditions and desirably are determined so as to maximize mixing while maintaining the desired fuel and air side pressure drops.

In the exemplary embodiment shown in FIGS. 3, 4 and 5, the fuel supply passage is formed in part by a separate, fuel pipe 45 (not shown in the view of FIG. 5) that is disposed within the center body 44 and that provides an actively controlled supply of fuel to the plurality of premix passages 61 of the premix pilot nozzle 60. Thus, as far as the supply of fuel to the premix pilot nozzle 60 is concerned, the embodiment depicted in FIGS. 3, 4 and 5 can be deemed an embodiment that employs an active fuel supply.

As schematically shown in FIG. 3 for example, the fuel pipe 45 internally defines a fuel passage that has an upstream end disposed at the upstream end of the center body 44 and that is configured for connection to an actively controlled source of fuel. As schematically shown in FIG. 3, the actively controlled fuel is supplied to the upstream of end fuel pipe 45 through the end plate 27. As schematically shown in FIGS. 3 and 4 for example, the portion of the fuel supply passage defined within the fuel pipe 45 has a downstream end that is disposed at the downstream end of the center body 44 and that fluidly connects to the upstream ends of the plurality of premix passages 61. As schematically shown in FIG. 4 for example, the downstream end of the fuel pipe 45 is connected in fluid communication with a fuel plenum 63 (not discernible in the view of FIG. 3) that is defined in an embodiment of the premix pilot nozzle 60. The fuel plenum 63 is a hollow fuel passage that forms part of the fuel supply passage and that is configured to extend circumferentially around the upstream end of the premix pilot nozzle 60 and in fluid communication with the upstream ends of each premix passage 61 at a location just immediately downstream of the fill openings 61a in the upstream ends of the premix passages 61. Thus, the fuel pipe 45 reaches the premix pilot nozzle 60 at the downstream end of the center body 44 and supplies fuel to the premix pilot nozzle 60.

As schematically shown in FIG. 3, the fuel premix injection ring 48 (aka swozzle) is provided with a plurality of auxiliary air passages 43 through which air 30 from the head end volume 13 (FIG. 2) passively enters the hollow interior 51 of the center body 44, and this passively supplied air flow 30 travels downstream to the premix pilot nozzle 60 at the downstream end of the center body 44. As schematically shown in FIG. 4, the air 30 travelling downstream in the hollow interior 51 of the center body 44 enters each fill opening 61a of each premix passage defined by each premix tube 64 and mixes with the fuel injected into each premix passage 61 and undergoes continued mixing of the fuel-air mix while the fuel-air mix travels downstream within the premix passages 61. Moreover, as schematically shown in FIG. 4 for example, the fuel plenum 63 desirably communicates with each premix passage 61 near the inlet 67 of the premix pilot nozzle 60 so that the air entering the respective premix passage 61 encounters the fuel and mixes with the fuel over most of the axial length of the respective passage 61 before the fuel/air mixture leaves the respective passage 61 via its exit opening 61b. Thus, as far as the supply of air and fuel to the premix pilot nozzle 60 is concerned, the embodiment depicted in FIGS. 3 and 4 can be deemed an embodiment that employs a passive air supply and an active fuel supply.

In the exemplary embodiment shown in FIG. 6, the elements in common with the embodiment shown in FIGS. 3-5 are enumerated with the same designating numerals as found in FIGS. 3-5. However, as far as the supply of air and fuel to the premix pilot nozzle 60 is concerned, the embodiment depicted in FIG. 6 can be deemed an embodiment that employs an active air supply and a passive fuel supply and is in this sense different than the embodiment found in FIGS. 3 and 4.

Figure 7:
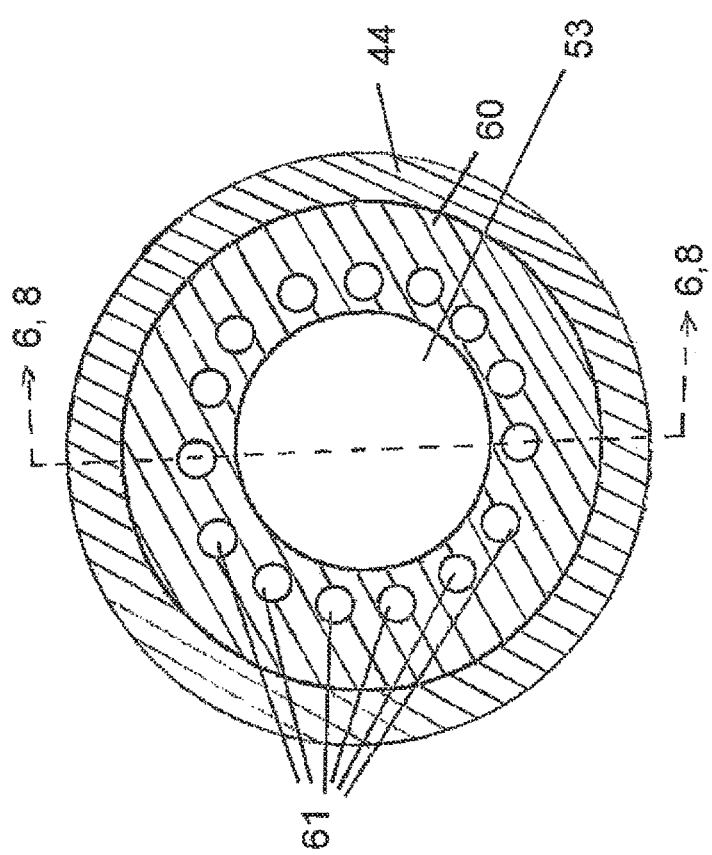
FIG. 7 is a schematic representation of a cross-sectional view taken along the lines 7-7 in FIG. 6 of a premix pilot nozzle in accordance with an embodiment of the present invention or along the lines 7-7 in FIG. 8 of a premix pilot nozzle in accordance with another embodiment of the present invention.

As schematically shown in cross sectional views of FIGS. 6 and 7, an exemplary embodiment of the premix pilot nozzle 60 has an upstream end connected to the downstream end of the center body 44. The premix pilot nozzle 60 defines an axially extending inner channel 53 that fluidly communicates with the hollow interior 51 of the center body 44. The premix pilot nozzle 60 has a downstream end disposed axially opposite the upstream end of the premix pilot nozzle 60. As schematically shown in cross section in FIGS. 6 and 7, the premix pilot nozzle 60 defines a plurality of axially elongated, hollow premix passages 61, which desirably are arranged symmetrically and circumferentially around the axially extending inner channel 53. Each premix passage 61 has an upstream end disposed near the downstream end of the center body 44 and defining a fill opening 61a that admits fluid to flow into the hollow premix passage 61 and communicates fluidly with the interior passage 51 of the center body 44. As schematically shown in FIG. 6, an actively controlled flow of air 30 is introduced into the interior passage 51 of the center body 44 and flows downstream to the fill openings 61a of the hollow premix passages 61 of the premix pilot nozzle 60. Each premix passage 61 has a downstream end disposed axially opposite the upstream end of the premix passage 61 and that is disposed near the downstream end of the premix pilot nozzle 60. Each downstream end of each premix passage 61 defines an exit opening 61b that allows fluid to discharge from the hollow premix passage 61.

Fuel is supplied from the end plate 27 (FIG. 2) into the annular fuel passage 46. As schematically shown in FIG. 6, the radial fuel passages 52 provide fuel from the annular fuel passage 46 into the fuel premix injection ring 48. Some of the actively controlled fuel from the annular fuel passage 46 is diverted from the fuel outlet openings 49 in the swirler vanes 47 and continues flowing downstream in the annular fuel passage 46 to provide a passive supply of fuel to the premix pilot nozzle 60 at the downstream end of the center body 44. As schematically shown in cross section in FIG. 6, an exemplary embodiment of the premix pilot nozzle 60 defines a fuel inlet 62 that forms part of the fuel supply passage that fluidly connects each premix passage 61 with a source of fuel. In the embodiment of FIG. 6, the fuel inlet 62 extends radially inwardly from the downstream end of the annular fuel passage 46 so as to inject fuel into each premix passage 61 immediately downstream of the fill opening 61a of that premix passage 61. The actively controlled flow of air 30 travelling downstream in the hollow interior 51 of the center body 44 enters the premix passages 61 via the fill openings 61a and mixes with the passive supply of fuel that is provided to the premix passages 61 of the premix pilot nozzle 60. In this manner, the air flow entering the fill opening 61a of each premix passage 61 in the premix pilot nozzle 60 entrains and mixes with the fuel injected into each premix passage 61 and undergoes continued mixing of the fuel-air mix while the fuel-air mix travels downstream within the premix passages 61.

Figure 8:
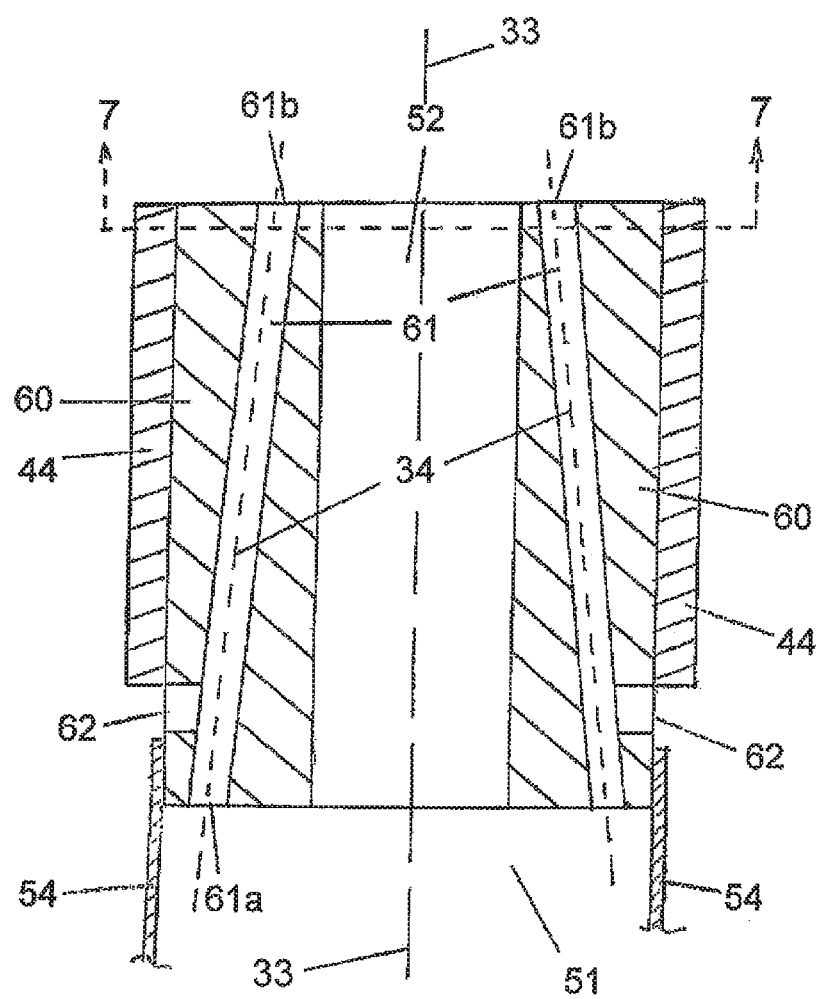
FIG. 8 is a schematic representation of a cross-sectional view taken along the lines 8-8 in FIG. 7 of a premix pilot nozzle in accordance with another embodiment of the present invention.

FIG. 8 schematically illustrates another exemplary embodiment of the premix pilot nozzle 60 in a cross sectional view similar to the view shown in FIG. 6, but taken along the lines 8-8 in FIG. 7. In FIG. 8, the elements in common with the embodiment shown in FIGS. 6 and 7 are enumerated with the same designating numerals as found in FIGS. 6 and 7. However, unlike the embodiment depicted in FIGS. 6 and 7, in the FIG. 8 embodiment there are so-called angled premix passages 61. As schematically shown in FIG. 8 for example, each premix passage 61 has a premix axis 34 (FIG. 12) about which its defining walls are concentrically defined. As schematically shown in FIG. 8 for example, this centrally symmetric premix axis 34 desirably is disposed at an acute angle with respect to the symmetrically central axis 33 of the center body 44 and the premix pilot nozzle 60. This angle of each angled premix passage 61 imparts to the fuel-air mix that is discharged from the exit opening 61b of each premix passage 61 a radially inwardly directed component in a direction that crosses the axial path of the air that exits from within the axially extending inner channel 53 of the premix pilot nozzle 60 after having passed through the hollow interior 51 of the center body 44. Each angled premix passage 61 also imparts swirl to the flow of air leaving the axially extending inner channel 53 of the premix pilot nozzle 60.

The magnitude of the acute angle desirably measures on the order of 4.5 degrees and can range from 3 degrees to 6 degrees. Moreover, due to the acute angle, the length of the mixing path within each premix passage 61 of the embodiment of the premix pilot nozzle 60 depicted in FIG. 8 desirably is lengthened relative to the length of the mixing path within each premix passage 61 in the embodiment of FIGS. 6 and 7, assuming the lengths of the premix pilot nozzles 60 are the same. Desirably, the axial length of the premix pilot nozzle 60 measures in the range of 7.6 cm to 12.7 cm and desirably has a diameter on the order of 5 cm or less than half the axial length of the premix pilot nozzle 60. The diameters of the premix passages 61 desirably are in the range of 2 mm to 7 mm. However, the diameters and the number of premix passages 61 formed in the premix pilot nozzle 60 will depend on the desired flows deemed optimal under the anticipated operating conditions and desirably are determined so as to maximize mixing while maintaining the desired fuel side pressure drop.

Figure 9:
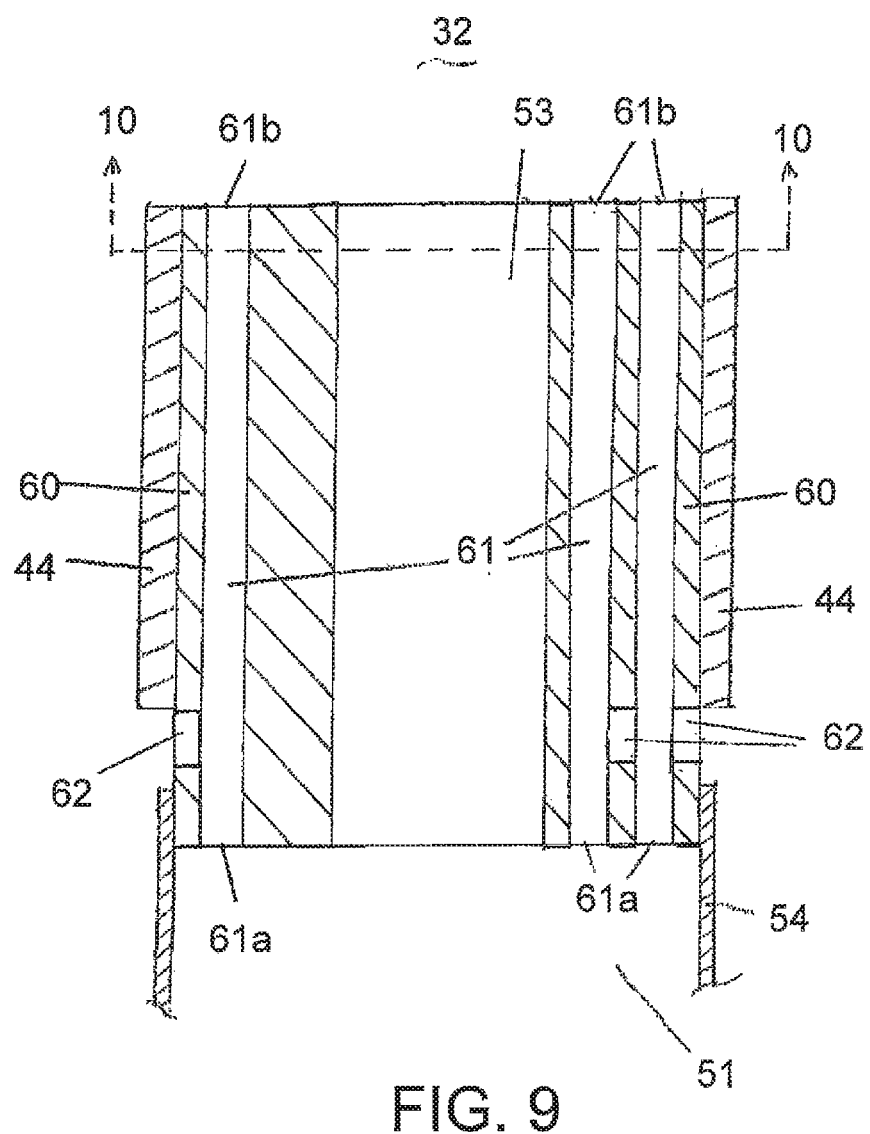
FIG. 9 is a schematic representation of a cross-sectional view taken along the lines 9-9 in FIG. 10 of a premix pilot nozzle in accordance with an embodiment of the present invention.
Figure 10:
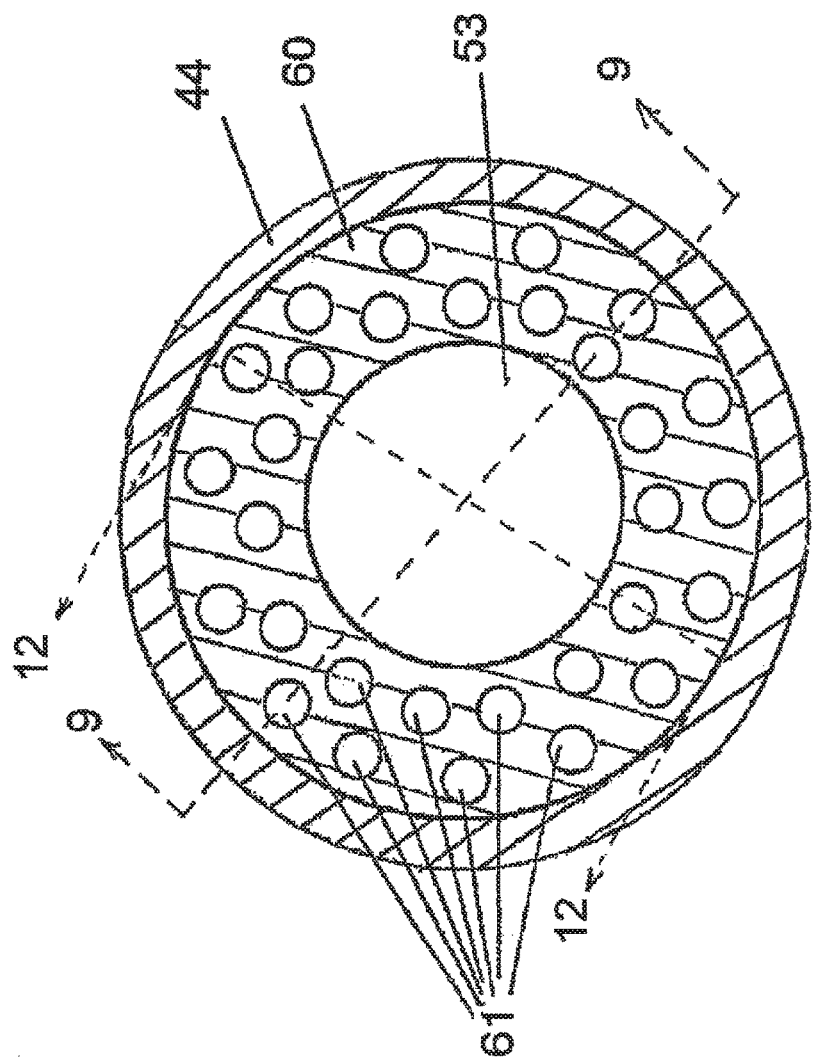
FIG. 10 is a schematic representation of a cross-sectional view taken along the lines 10-10 in FIG. 9 of a premix pilot nozzle in accordance with an embodiment of the present invention.

FIGS. 9 and 10 schematically illustrate another exemplary embodiment of the premix pilot nozzle 60 in a cross sectional view similar to the view shown in FIG. 6, but FIG. 9 is taken along the lines 9-9 in FIG. 10, and FIG. 10 is taken along the lines 10-10 in FIG. 9. In FIGS. 9 and 10, the elements in common with the embodiments shown in FIGS. 6-8 are enumerated with the same designating numerals as found in FIGS. 6-8. However, unlike the embodiment depicted in FIGS. 6-8, in the embodiment depicted in FIGS. 9 and 10, more than one circular grouping of premix passages 61 is provided. An inner grouping of premix passages 61 is disposed radially inwardly of an outer grouping of premix passages 61. As schematically shown in FIG. 10 for example, this embodiment of the premix pilot nozzle 60 desirably includes thirty premix passages 61 and attains about a two and one half percent air/fuel mix.

In the embodiments of the premix pilot nozzle 60 schematically shown in FIGS. 6-10 for example, the premix pilot nozzle desirably is formed of a solid cylindrical metal stock in which each of the premix passages 61 is defined by a bore through the metal stock. The number and orientation of the premix passages 61 are set to maximize air/fuel mixing while maintaining the desired fuel side pressure drop.

Figure 11:
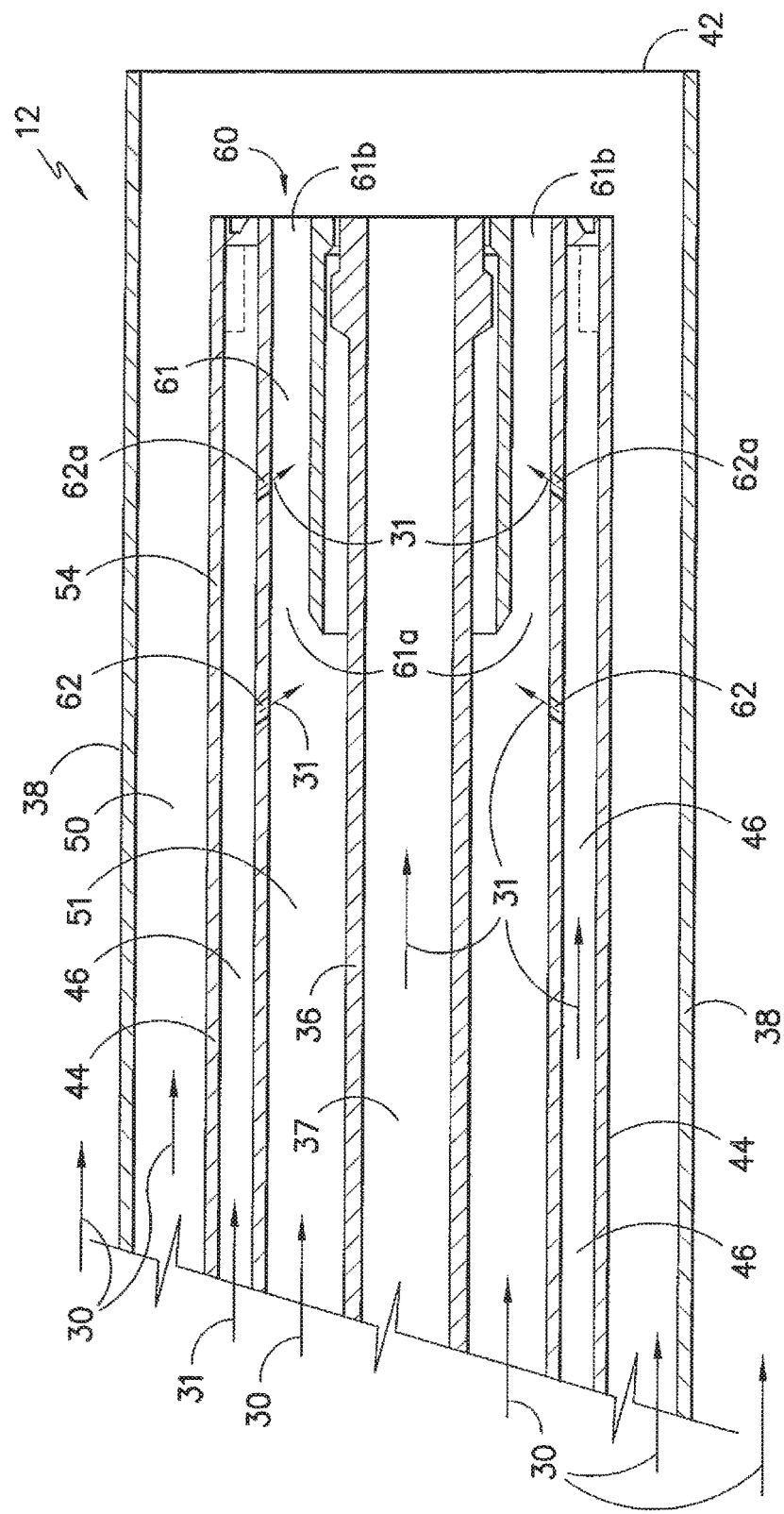
FIG. 11 is a schematic representation of a cross-sectional view of a part of a fuel nozzle with premix pilot nozzle in accordance with a further embodiment of the present invention.

FIG. 11 schematically illustrates another exemplary embodiment of the premix pilot nozzle 60 in a cross sectional view similar to the view shown in FIGS. 8 and 9. In FIG. 11, the elements in common with the embodiments shown in FIGS. 6-10 are enumerated with the same designating numerals as found in FIGS. 6-10. However, internally of the center body 44, the embodiment of FIG. 11 includes a cylindrical fuel cartridge 36 defining a central fuel passage 37 through which an actively controlled supply of fuel flows in the downstream direction as schematically indicated by the numeral 31. As further schematically indicated by the arrows designated 31 in FIG. 11 and similar to the configuration of FIG. 6, a passive supply of fuel is the fuel that is diverted from the active supply of fuel that flows from the combustor's end plate 27 (not shown in FIG. 11, see FIG. 2) and into the annular fuel passage 46 before being injected into the fuel premix injection ring 48 (not shown in FIG. 11). As schematically shown in FIG. 11, it is this diverted passive supply of fuel 31 that is injected into the hollow interior 51 of the center body 44 via the fuel inlets 62.

As further schematically indicated by the arrows designated 30 in FIG. 11, air 30 is actively supplied and flows downstream through the hollow interior 51 of the center body 44 and carries fuel exiting from the primary fuel inlets 62 downstream through the fill openings 61a and into the premix passages 61 in the premix pilot nozzle 60. In this manner, the air flow traveling past the primary fuel inlets 62 entrains and mixes with the fuel injected into the hollow interior 51 of the center body 44 and enters the fill opening 61a of each premix passage 61 in the premix pilot nozzle 60. The fuel-air mix undergoes continued mixing while traveling downstream within the premix passages 61.

Additionally, the embodiment of FIG. 11 further defines secondary fuel inlets 62a through the inner cylindrical wall 54 at locations downstream from the primary fuel inlets 62. The secondary fuel inlets 62a inject fuel directly into the premix passages 61 so that the fuel-air mix becomes enriched with fuel and undergoes additional mixing while traveling downstream within the premix passages 61. As schematically depicted in FIG. 11, both the primary fuel inlets 62 and the secondary fuel inlets 62a desirably are biased at an angle toward the downstream direction. While FIG. 11 illustrates an embodiment of the premix pilot nozzle 60 having both the primary fuel inlets 62 and the secondary fuel inlets 62a, it is contemplated that only one set, primary 62 or secondary 62a, can be provided in a given alternative embodiment of the premix pilot nozzle 60.

Figure 12:
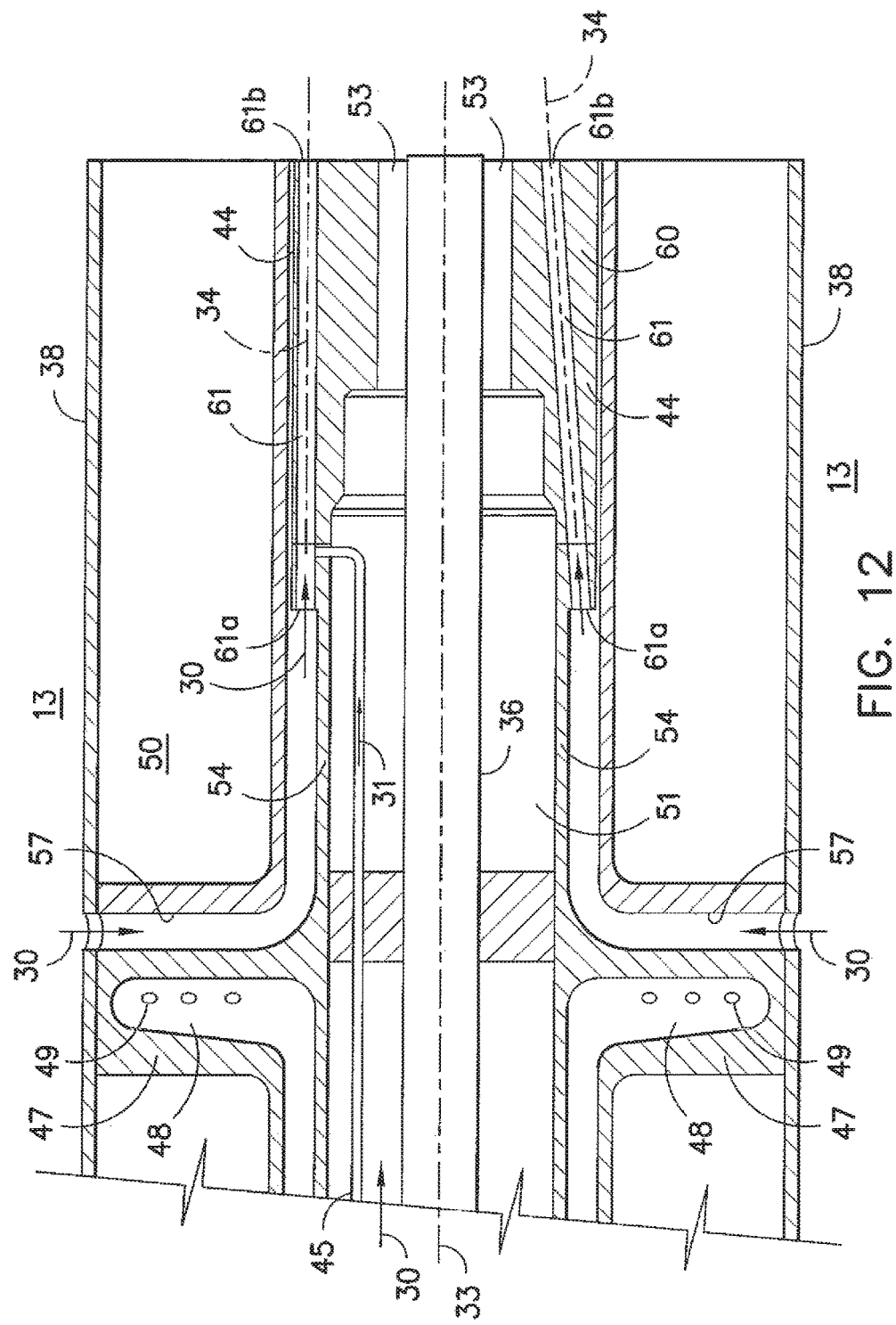
FIG. 12 is a schematic representation of a cross-sectional view of part of a fuel nozzle with premix pilot nozzle in accordance with yet another embodiment of the present invention and taken along the sight lines designated 12-12 in FIG. 10.

FIGS. 10 and 12 schematically illustrate another exemplary embodiment of the premix pilot nozzle 60 in a cross sectional view similar to the view shown in FIG. 8, but FIG. 12 is taken along the lines 12-12 in FIG. 10. In FIGS. 10 and 12, the elements in common with the embodiments shown in FIGS. 6-8 are enumerated with the same designating numerals as found in FIGS. 6-8. In the embodiment schematically shown in FIGS. 10 and 12, the premix pilot nozzle 60 is integrally formed as part of the inner cylindrical wall 54 defining the hollow interior 51 of center body 44 and the exterior wall 44 that defines center body. Thus, as schematically shown in FIG. 12, the inner cylindrical wall 54 defines the radially inner walls of the premix passages 61 while the exterior wall 44 that defines center body forms the radially outer walls of the premix passages 61.

In embodiment schematically shown in FIGS. 10 and 12, some of premix passages 61 have defining walls that are concentrically defined about a central premix axis 34 (FIG. 12) that desirably is disposed parallel to the symmetrically central axis 33 of the center body 44 and the premix pilot nozzle 60. However, unlike the embodiment depicted in FIGS. 6-8, in the embodiment depicted in FIGS. 10 and 12, more than one circular grouping of premix passages 61 is provided, and thus there is an inner circular grouping of premix passages 61 disposed radially inwardly of an outer circular grouping of premix passages 61. Moreover, in the embodiment depicted in FIGS. 10 and 12, some of the premix passages 61 have defining walls that are concentrically defined about a premix axis 34 that desirably is disposed at an acute angle with respect to the symmetrically central axis 33 of the center body 44 and the premix pilot nozzle 60.

The embodiment depicted in FIGS. 10 and 12 is similar to the exemplary embodiment shown in FIGS. 3, 4 and 5 in that the fuel supply passage is formed in part by a separate, fuel pipe 45 that is disposed within the center body 44 and permits active control of the supply of fuel to the premix passages 61. As schematically shown by the heavy typeface line in FIG. 12 for example, the fuel pipe 45 internally defines a fuel passage that has an upstream end disposed at the upstream end of the center body 44 and that is configured for connection to an actively controlled source of fuel. As schematically shown in FIG. 12 by the arrows designated by the numeral 30, air is supplied passively to the fill openings 61a of the premix passages 61 from the curtain air passages 57 from the head end volume 13. As schematically shown in FIG. 12, the portion of the fuel supply passage defined within the fuel pipe 45 has a downstream end that is disposed at the downstream end of the center body 44 and that fluidly connects to the upstream ends of the plurality of premix passages 61. The fuel pipe 45 actively injects fuel into the premix passages 61 immediately downstream of the fill openings 61a of the premix passages 61 in order to promote maximum mixing of the fuel and air that travels downstream within the premix passages 61. Thus, as far as the supply of air and fuel to the premix pilot nozzle 60 is concerned, the embodiment depicted in FIGS. 10 and 12 can be deemed an embodiment that employs a passive air supply and an active fuel supply.

As schematically shown in FIG. 12, the angle of each angled premix passage 61 is so configured so as to direct the fuel-air mix that is discharged from the exit opening 61b of each angled premix passage 61 radially inwardly in a direction that crosses the axial path of the air that exits from within the axially extending inner channel 53 of the premix pilot nozzle 60 after having passed through the hollow interior 51 of the center body 44 and imparts additional swirl to the flow of fuel and air. The magnitude of the acute angle desirably measures on the order of 4.5 degrees and can range from 3 degrees to 6 degrees. Moreover, due to the acute angle, the length of the mixing path within each angled premix passage 61 of the embodiment of the premix pilot nozzle 60 depicted in FIG. 12 desirably is lengthened relative to the length of the mixing path within each strictly axial premix passage 61 that elongates strictly parallel to the symmetrically central axis 33 of the center body 44 and the premix pilot nozzle 60 in the FIG. 12 embodiment.

Figure 13:
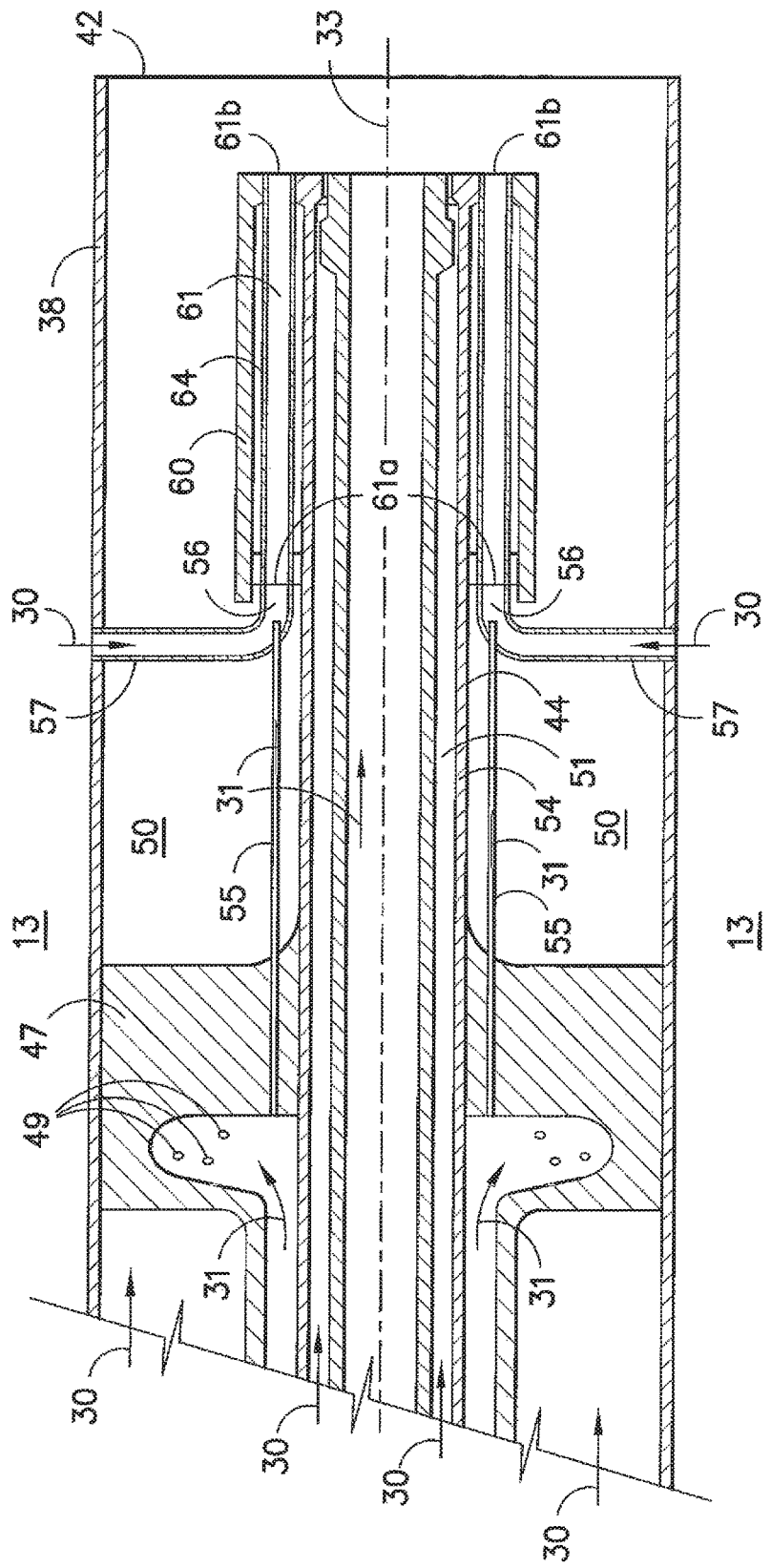
FIG. 13 is a schematic representation of a cross-sectional view of part of a fuel nozzle with premix pilot nozzle in accordance with still another embodiment of the present invention.

FIG. 13 schematically illustrates still a further exemplary embodiment of the premix pilot nozzle 60 in a cross sectional view similar to the view shown in FIG. 3. In FIG. 13, the elements in common with the embodiments shown in FIGS. 3-5 are enumerated with the same designating numerals as found in FIGS. 3-5. In the embodiment schematically shown in FIG. 13, a passive supply of fuel and a passive supply of air are fed to the premix passages 61 of the premix pilot nozzle 60. The embodiment of FIG. 13 provides the premix pilot nozzle 60 in a configuration in which the premix passages 61 are arranged circumferentially around the downstream end of the center body 44. Internally of the center body 44, the embodiment of FIG. 13 includes an air plenum 56 fluidly connecting to the fill openings 61a of the premix passages 61. A passive flow of air is carried from the head end volume 13 (FIG. 2) and supplied to the air plenum 56 via a plurality of radial air supply tubes 57 that extend through the axially elongating peripheral wall 38. The fuel supply for the fuel outlet openings 49 in the swirler vanes 47 is tapped so that some of this fuel supply is diverted from the fuel outlet openings 49 and provides a passive supply of fuel 31 that is carried via axially extending fuel conduits 55 downstream to the air plenum 56. As schematically indicated in FIG. 13, each of the distal ends of the axially extending fuel conduits 55 extends into the radial air supply tubes 57 near where the radial air supply tubes 57 connect to the air plenum 56. With this configuration, the fuel 31 is passively injected into the air flow 30 supplied via the radial air supply tubes 57 before that air flow 30 reaches the air plenum 56 and the fill openings 61a of the premix passages 61. As in the other embodiments of the premix pilot nozzle 60, the fuel 31 and air 30 mixes while traveling downstream within the premix passages 61. The fuel-air mix that leaves the exit opening 61b of each premix passage 61 is thoroughly mixed and thus combusts more efficiently to provide a small, well anchored premixed flame near the base of the fuel nozzle 12, thus anchoring the swirling fuel air mixture exiting the fuel nozzle 12.

Figure 14:
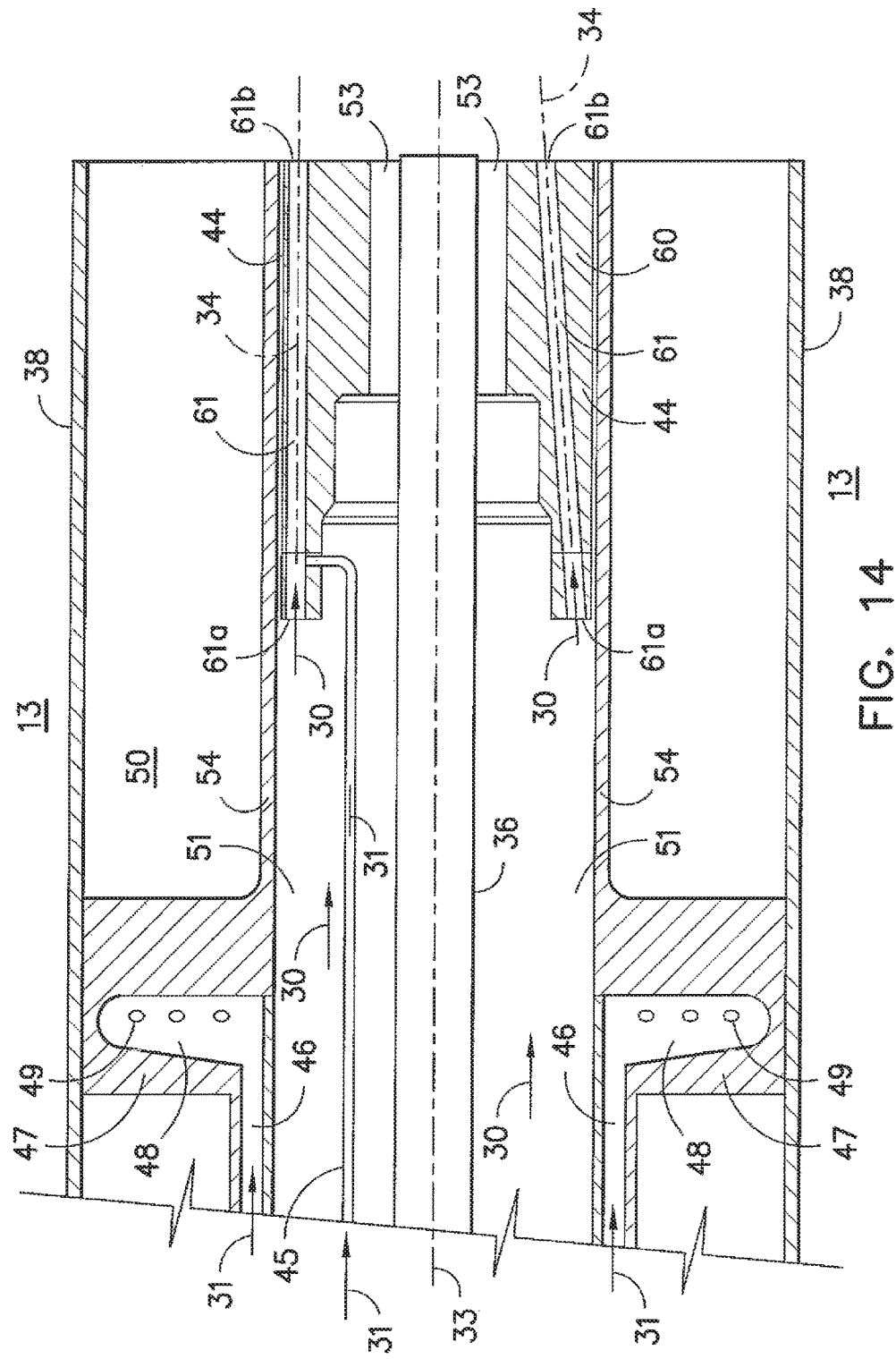
FIG. 14 is a schematic cross section view of a representation of part of a fuel nozzle with a breech-loaded premix pilot nozzle in accordance with an additional embodiment of the present invention.

FIG. 14 schematically illustrates still a further exemplary embodiment of the premix pilot nozzle 60, in a cross sectional view similar to the view shown in FIG. 12. However, while the FIG. 14 embodiment has an active fuel supply to the premix pilot nozzle 60 as in the FIG. 12 embodiment, the FIG. 14 embodiment also has an active air supply to the premix pilot nozzle 60. In FIG. 14, the elements in common with the embodiments shown in FIGS. 3-5, 12 and 13 are enumerated with the same designating numerals as found in FIGS. 3-5, 12 and 13. As schematically shown in FIG. 14, fuel from the annular fuel passage 46 is actively controlled to flow into the fuel premix injection ring 48 and exits out of the fuel outlet openings 49 defined through the swirler vanes 47. The fuel ejected from the fuel outlet openings 49 is supplied into the radially outer air passage 50 for premixing fuel and air in the radially outer air passage 50 upstream of the combustion chamber reaction zone 32. As air is directed against the air swirler vanes 47, a swirling pattern is imparted to the air, and this swirling pattern facilitates the mixing of the air with the primary fuel that is ejected from the fuel outlet openings 49 of the air swirler vanes 47 into the passing air flow. The air/fuel mixture exiting the radially outer air passage 50 flows into the combustion chamber reaction zone 32, where it is combusted.

However, the embodiment of FIG. 14 provides the premix pilot nozzle 60 in a configuration that is disposed circumferentially around the downstream end of the center body 44. An actively controlled supply of air 30 is provided to the premix passages 61 of the premix pilot nozzle 60 via the hollow interior 51 defined by the inner cylindrical wall 54 of the center body 44. In the exemplary embodiment shown in FIG. 14, an actively controlled supply of fuel is provided from the center body 44 to the premix pilot nozzle 60. As schematically shown in FIG. 14, the portion of the fuel supply passage defined within the fuel pipe 45 has a downstream end that is disposed at the downstream end of the center body 44 and that fluidly connects to the upstream ends of the plurality of premix passages 61. The fuel pipe 45 actively injects fuel 31 into the premix passages 61 immediately downstream of the fill openings 61a of the premix passages 61 in order to promote maximum mixing of the fuel and air that travels downstream within the premix passages 61. In this manner, the air flow 30 entering the fill opening 61a of each premix passage 61 in the premix pilot nozzle 60 entrains and mixes with the fuel 31 injected into each premix passage 61 and undergoes continued mixing of the fuel-air mix while the fuel-air mix travels downstream within the premix passages 61.

Figure 15:
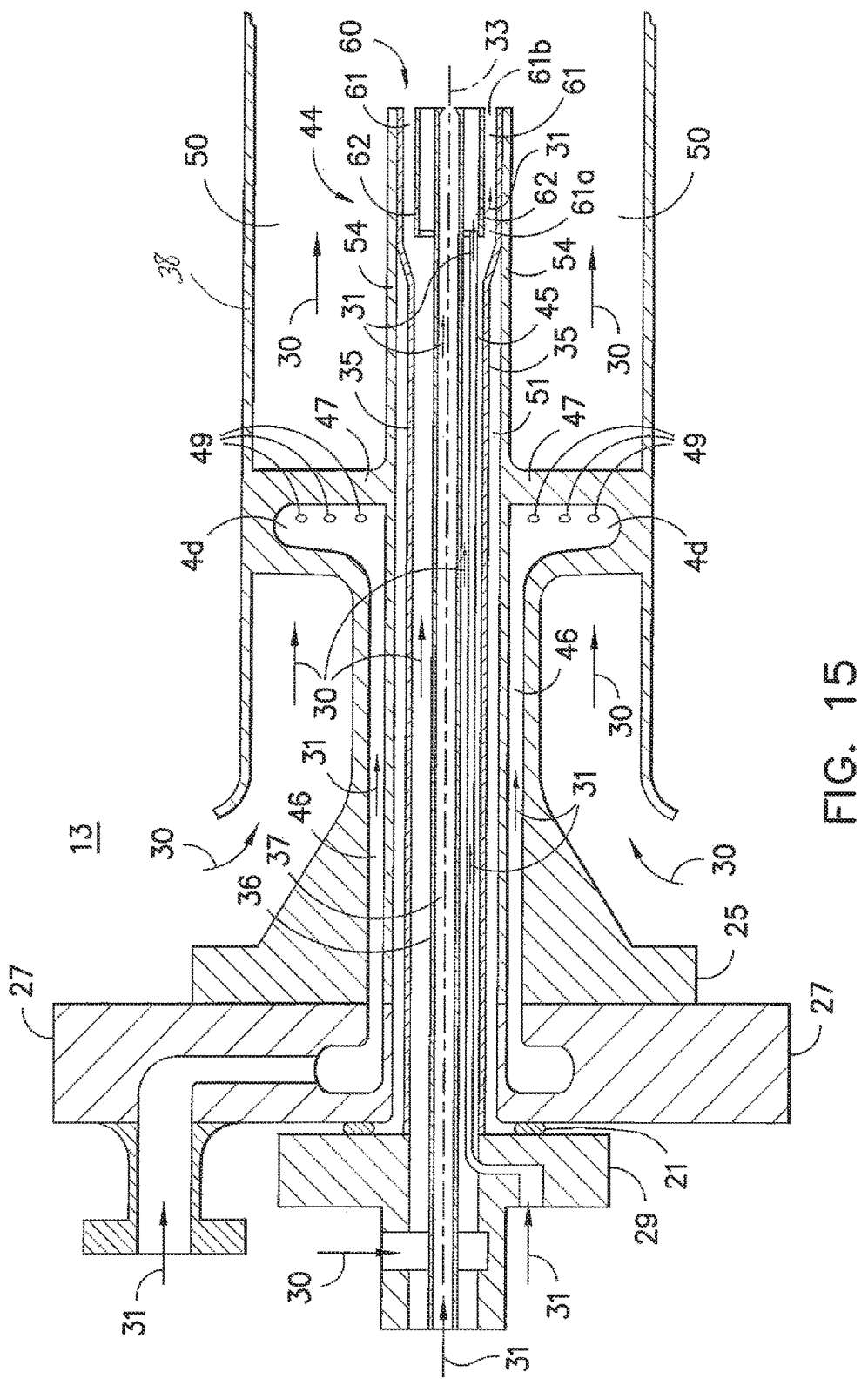
FIG. 15 is a schematic cross section view of a representation of part of a fuel nozzle with a breech-loaded premix pilot nozzle in accordance with a further embodiment of the present invention.

FIG. 15 schematically illustrates still a further exemplary embodiment of the premix pilot nozzle 60, in a cross sectional view. However, the FIG. 15 embodiment illustrates a breech-loaded premix pilot cylinder 35 having at the downstream end thereof a premix pilot nozzle 60. In FIG. 15, the elements in common with the embodiments shown in FIGS. 2-5 and 11-13 are enumerated with the same designating numerals as found in FIGS. 2-5 and 11-13. As schematically shown in FIG. 15, air flow 30 from the head end volume 13 (FIG. 2) is actively controlled to flow past the fuel premix injection ring 48 and its swirler vanes 47. As schematically shown in FIG. 15, an actively controlled flow of fuel 31 is supplied through the end plate 27 into the annular fuel passage 46 and thence into the fuel premix injection ring 48 and exits out of the fuel outlet openings 49 defined through the swirler vanes 47. The fuel ejected from the fuel outlet openings 49 is supplied into the radially outer air passage 50 for premixing fuel and air in the radially outer air passage 50 upstream of the combustion chamber reaction zone 32. As the air flow 30 is directed against the air swirler vanes 47, a swirling pattern is imparted to the air, and this swirling pattern facilitates the mixing of the air with the primary fuel that is ejected from the fuel outlet openings 49 of the air swirler vanes 47 into the passing air flow. The air/fuel mixture exiting the radially outer air passage 50 flows into the combustion chamber reaction zone 32, where it is combusted.

As schematically shown in FIG. 15, the breech-loaded oil cartridge 37 (which optionally can employ a gaseous fuel instead of liquid oil) and its surrounding breech-loaded premix pilot cylinder 35 slide into the hollow interior 51 defined by the inner cylindrical wall 54 of the center body 44, and the premix pilot flange 29 is connected to an end plate 27 of the combustor 16 by a seal 21 between the premix pilot flange 29 and the end plate 27. The cylindrical fuel cartridge 36 defines a central fuel passage 37 through which an actively controlled supply of fuel flows in the downstream direction as schematically indicated by the numeral 31. As schematically shown in FIG. 15, an actively controlled air flow 30 is provided through the premix pilot flange 27 and flows downstream in the annular channel formed between the exterior surface of the cylindrical fuel cartridge 36 and the interior surface of the breech-loaded premix pilot cylinder 35. As schematically shown in FIG. 15, premix pilot fuel 31 is actively controlled to flow into the fuel pipe 45 that is connected to the upstream end of the fuel premix pilot nozzle 60. As schematically shown in cross section in FIG. 15, the fuel 31 from the fuel pipe 45 enters each premix passage 61 via a fuel inlet 62 that is defined in the radially inwardly disposed wall that defines each premix passage 61 so as to inject fuel into each premix passage 61 immediately downstream of the fill opening 61a of that premix passage 61 in order to promote maximum mixing of the fuel and air that travels downstream within the premix passages 61. In this manner, the air flow 30 entering the fill opening 61a of each premix passage 61 in the premix pilot nozzle 60 entrains and mixes with the fuel 31 injected into each premix passage 61 and undergoes continued mixing of the fuel-air mix while the fuel-air mix travels downstream within the premix passages 61.

In each embodiment of the premix pilot 60 disclosed herein, the fuel-air mix that leaves the exit opening 61b of each premix passage 61 is thoroughly mixed and thus combusts more efficiently to provide a small, well anchored premixed flame near the base of the fuel nozzle 12, thus anchoring the swirling fuel air mixture exiting the fuel nozzle 12. The improved flame stability enables lower fuel/air operations, thus extending LBO and the operating window of the gas turbine system 10 below 3 ppm NOx emissions. The adaptability to both passive air and passive fuel feeds enables a very simple lower cost design.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A fuel injector for a gas turbine engine, comprising:
   a. an axially elongating peripheral wall defining an outer envelope of the injector, the wall having an interior surface defining an axially elongating interior cavity;
   b. a center body disposed within the axially elongating interior cavity, the center body defined by an exterior wall and an inner cylindrical wall, wherein the exterior wall includes an upstream end and a downstream end of the center body, said downstream end disposed axially opposite the upstream end, the exterior wall concentrically arranged about a longitudinal axis of the axially elongating peripheral wall, and wherein the inner cylindrical wall is concentrically arranged about the longitudinal axis, and wherein the exterior wall and inner cylindrical wall define a hollow axially elongating interior passage radially therebetween through which air flows from the upstream end to the downstream end, and wherein the center body and the axially elongating peripheral wall define a primary air flow channel therebetween;
   c. a fuel pipe positioned within the center body, wherein the fuel pipe extends axially from the upstream end to the downstream end of the center body, the fuel pipe defining a fuel passage disposed radially outward from the longitudinal axis of the axially elongating peripheral wall, the fuel pipe configured in fluid connection to a source of fuel;
   d. a radial air supply tube, the radial air supply tube defining an auxiliary air passage through which air from a head end volume enters the axially elongating interior passage; and
   e. a premix pilot nozzle positioned at the downstream end of the center body, the premix pilot nozzle defining a plurality of axially extending premix passages in fluid communication with the fuel passage and defining a plurality of exit openings at a downstream end of the premix pilot nozzle, the premix pilot nozzle defining at least one fill opening at an upstream end of the premix pilot nozzle, the at least one fill opening communicating a fluid from the interior passage to the plurality of premix passages, the premix pilot nozzle defining an outlet at the downstream end of the premix pilot nozzle, and wherein the premix pilot nozzle defines an axially extending inner channel radially inward of the fuel pipe extending upstream from the outlet to a downstream end of the interior passage.

2. The fuel injector of claim 1, further comprising:
   a fuel cartridge disposed in the axially elongating interior cavity and the axially extending inner channel, wherein the fuel cartridge defines a central fuel passage through which a supply of fuel flows in a downstream direction.

3. The fuel injector of claim 1, wherein each premix passage of the premix pilot nozzle defines a fill opening of the at least one fill opening that admits fluid to flow into the respective premix passage and communicates fluidly with the interior passage of the center body.

4. The fuel injector of claim 1, wherein the premix passages are disposed between the inner cylindrical wall and the exterior wall.

5. The fuel injector of claim 1, wherein the exit opening of each premix passage is arranged circumferentially around the inner channel.

6. The fuel injector of claim 1, wherein each premix passage is arranged circumferentially around the inner channel.

7. The fuel injector of claim 1, further comprising a plurality of radial air supply tubes, each radial air supply tube extending through the axially elongating peripheral wall and fluidly connecting with at least one of the at least one fill opening.

8. The fuel injector of claim 1, wherein an actively controlled supply of air and/or fuel is configured to flow in the downstream direction of the interior passage defined by the inner cylindrical wall.

9. The fuel injector of claim 1, wherein the center body has a centrally symmetric axial centerline and each premix passage has a premix axis about which its defining walls are concentrically defined, and at least one of the premix passages is an angled premix passage such that the premix axis of the at least one angled premix passage is disposed at an acute angle with respect to the centrally symmetric axial centerline of the center body.

10. The fuel injector of claim 9, wherein the acute angle of each angled premix passage is configured and disposed so as to impart to the flow direction of a fuel-air mix that discharges from the exit opening of each angled premix passage a radially inwardly directed component in a direction that moves toward the centrally symmetric axial centerline of the center body.

* * * * *